US010341186B2

(12) United States Patent
Preimesberger et al.

(10) Patent No.: US 10,341,186 B2
(45) Date of Patent: Jul. 2, 2019

(54) ADDING A NETWORK UNIT TO A MANAGEMENT GROUP

(71) Applicant: Hewlett Packard Enterprise Development LP, Houston, TX (US)

(72) Inventors: Lee A. Preimesberger, Houston, TX (US); Jorge Daniel Cisneros, Houston, TX (US); Wei-Chao Chen, Taipei (TW)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 212 days.

(21) Appl. No.: 15/327,708

(22) PCT Filed: Apr. 17, 2015

(86) PCT No.: PCT/US2015/026509
§ 371 (c)(1),
(2) Date: Jan. 20, 2017

(87) PCT Pub. No.: WO2016/167810
PCT Pub. Date: Oct. 20, 2016

(65) Prior Publication Data
US 2017/0207973 A1    Jul. 20, 2017

(51) Int. Cl.
*G06F 15/177* (2006.01)
*G06F 15/173* (2006.01)
*H04L 12/24* (2006.01)
*H04L 29/06* (2006.01)

(52) U.S. Cl.
CPC ...... *H04L 41/0893* (2013.01); *H04L 41/0806* (2013.01); *H04L 41/0879* (2013.01); *H04L 41/28* (2013.01); *H04L 63/0869* (2013.01); *H04L 41/0883* (2013.01)

(58) Field of Classification Search
CPC ............. H04L 41/0893; H04L 41/0806; H04L 41/0879; H04L 41/0883; H04L 41/28; H04L 63/0869
USPC .................................................. 709/220–224
See application file for complete search history.

(56) References Cited

U.S. PATENT DOCUMENTS

| | | | |
|---|---|---|---|
| 6,604,207 B2 | 8/2003 | Sheikh | |
| 6,968,371 B1* | 11/2005 | Srinivasan | .......... H04L 41/0893 709/223 |
| 7,434,071 B2 | 10/2008 | Huang | |
| 8,033,686 B2 | 10/2011 | Becker | |
| 9,992,202 B2* | 6/2018 | Vajravelu | .............. H04L 63/101 |

(Continued)

OTHER PUBLICATIONS

"Sentry International & Sentry Shutdown" May 1997, 36 Pgs.<http://cdn1.servertech.com/assets/documents/documents/408/original/manual_intlshutdow>.

(Continued)

*Primary Examiner* — Bharat Barot
(74) *Attorney, Agent, or Firm* — Hewlett Packard Enterprise Patent Department

(57) ABSTRACT

Examples provided relate to adding a network unit to a management group. An example method includes receiving a numeric code on a first network unit from a button on a front panel of the first network unit. The numeric code is received on a second network unit using a button on a front panel of the second network unit. The first network unit is added to the management group of the second network unit.

13 Claims, 5 Drawing Sheets

(56) References Cited

U.S. PATENT DOCUMENTS

| | | | |
|---|---|---|---|
| 2002/0002582 A1 | 1/2002 | Ewing | |
| 2002/0099945 A1 | 7/2002 | McLintock et al. | |
| 2002/0113714 A1 | 8/2002 | Lopez | |
| 2006/0140225 A1* | 6/2006 | Christensen | H04J 3/14 370/536 |
| 2007/0143615 A1* | 6/2007 | Hiitola | H04M 1/7253 709/226 |
| 2008/0268776 A1 | 10/2008 | Amendola | |
| 2009/0006376 A1* | 1/2009 | Hendriks | H04W 4/02 707/999.005 |
| 2011/0053558 A1 | 3/2011 | Teague | |
| 2011/0055276 A1* | 3/2011 | Hamilton | H04L 41/0893 707/784 |
| 2012/0265865 A1* | 10/2012 | Tanaka | H04L 41/0893 709/223 |
| 2012/0284413 A1 | 11/2012 | Miura | |
| 2013/0122810 A1* | 5/2013 | Kaufman | H04L 63/083 455/41.2 |
| 2014/0040443 A1* | 2/2014 | Syu | H04W 24/02 709/222 |
| 2014/0075012 A1* | 3/2014 | Peterson | H04L 41/5025 709/224 |
| 2014/0195637 A1 | 7/2014 | Tahir et al. | |
| 2014/0372583 A1* | 12/2014 | Tseng | H04L 41/0803 709/223 |
| 2016/0352532 A1* | 12/2016 | Lamb | H04L 12/462 |

OTHER PUBLICATIONS

International Searching Authority, The International Search Report and the Written Opinion, PCT/US2015/026509, dated Jan. 15, 2016: 11 Pgs.

* cited by examiner

ADDING A NETWORK UNIT TO A MANAGEMENT GROUP

BACKGROUND

Network systems generally bind servers and other network units together into management groups. The binding can be performed by entering unit identification and access information into a management application for each system being added to the management group, for example, by username and password. The information is usually included on a sticker on each unit. Alternatively, system security may be bypassed for the network system, for example, by changing the security model to 'off' on the management processor. Another alternative, with system security bypassed, is to allow a preboot execution environment (PXE) to boot a network image to automatically add the system into a group based on a connected network segment.

DESCRIPTION OF THE DRAWINGS

Certain exemplary embodiments are described in the following detailed description and in reference to the drawings, in which.

DETAILED DESCRIPTION

The current techniques for binding network units into management groups, as described above, may take significant time or lower system security during the binding process. Further, the current techniques may take significant expertise and access to both the server units and a network management system.

Examples described herein provide a technique by which servers and other network units can be added to a system management group without accessing management software or lowering security. To bind network units into management groups, an operator enters a numeric code into a network unit using panel buttons, often positioned on the front of the network unit. The code is selected by the operator at the time of entry, and is merely used as a signaling and identification tool by the network unit. Once the code has been entered, the operator can enter the same code on a second network unit. The network units can locate each other over the network, for example, using uniform datagram protocol (UDP) broadcasts containing the numeric code. Other networks and network messages can be used in addition to, or instead of the UDP broadcasts. If the entered codes match, the network units are bound together into a single management group. If network units in different management groups are manually grouped, those management groups will automatically be bridged, e.g., network units in each management group can be added to create a larger management group comprising network units from both management groups.

Using the technique described, secure sites can add systems to management groups without recording and transcription of complicated usernames and passwords included on system tags. Further, systems can be automatically added into a management system without disabling system security, such as by setting 'security off' in proprietary baseboard management controllers (BMCs). Servers can be added to multiple management group based on the numeric code entered. An operator can move or add servers to separate groups through a sequence of button presses rather than systems being automatically added into one via PXE boot.

Figure 1A:
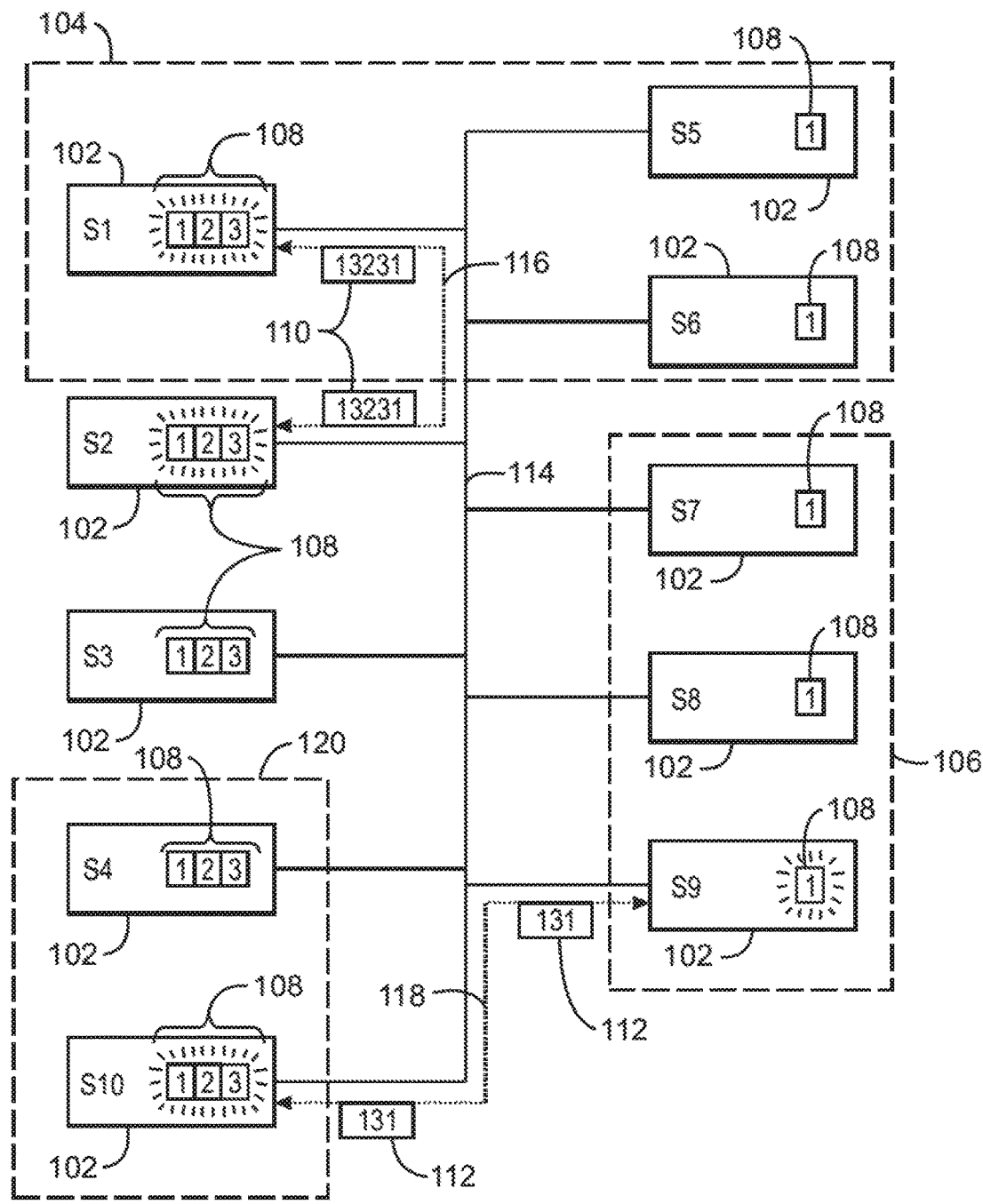
FIG. 1A is a schematic diagram of an example of a computing network illustrating the use of numeric codes to add network units to management groups.

FIG. 1A is a schematic diagram of an example of a computing network 100 illustrating the use of numeric codes to add network units 102 to management groups 104 and 106. The network units 102 may be servers, storage area networks (SANs), network attached storage (NAS), and the like.

Each network unit 102 may have one or more panel buttons 108 that can be used to control the network units 102. In this example, some of the network units 102, e.g., S5-S9, have a single panel button 108, while other network units 102, e.g., S1-S4 and S10, have three panel buttons 108. Network units 102 may have any number of panel buttons 108 from a single panel button 108 to complex keypads. The panel buttons 108 may be used to enter numeric codes 110 and 112. For example, a network unit 102 with three panel buttons 108, such as S1 and S2, may accept a numeric code 110 that is entered by pressing the panel buttons 108, such as in the sequence 1-3-2-3-1, giving the numeric code 110 of 13231. A single panel button 108 on a network unit 102, such as S9, may be used to enter a numeric code 112 by pressing the single panel button 108 in an intermittent sequence, e.g., 1-pause-1-1-1-pause-1, to give a numeric code 112 of 131.

The entry of a numeric code 110 or 112 may be indicated at the network unit 102. For example, the panel buttons 108 may be associated with status light emitting diodes (LED), and, thus, may be illuminated or flashed, as shown on the network units 102 that have accepted codes, e.g., S1, S2, S9, and S10. Further, these network units 102 may start broadcasting messages over the network 114, for example, using UDP packets that include an invitation to join a management group and the numeric codes 110 and 112. Each of the active network units 102, e.g., S1, S2, S9, and S10, may also start monitoring for UDP messages that include the invitations and numeric codes 110 and 112.

When network units 102, such as S1 and S2, detect a message that has the same numeric code 110, a communications link 116 is established over the network 114 allowing the network units 102 to exchange information on current membership in a management group, such as management group 104. The membership information may include the identifying information of other network units 102, such as S5 and S6, which are part of the management group 104.

A similar communications link 118 may be established between network units 102 S9 and S10 when messages containing the same numeric code 112 are identified. Once the communications link 118 is established, the linked network units 102 S9 and S10 exchange information on membership of management groups 106 and 120. For example, the information may include the identities of other network units 102, such as S4, S7, and S8, which are part of each management group 106 or 120.

Figure 1B:
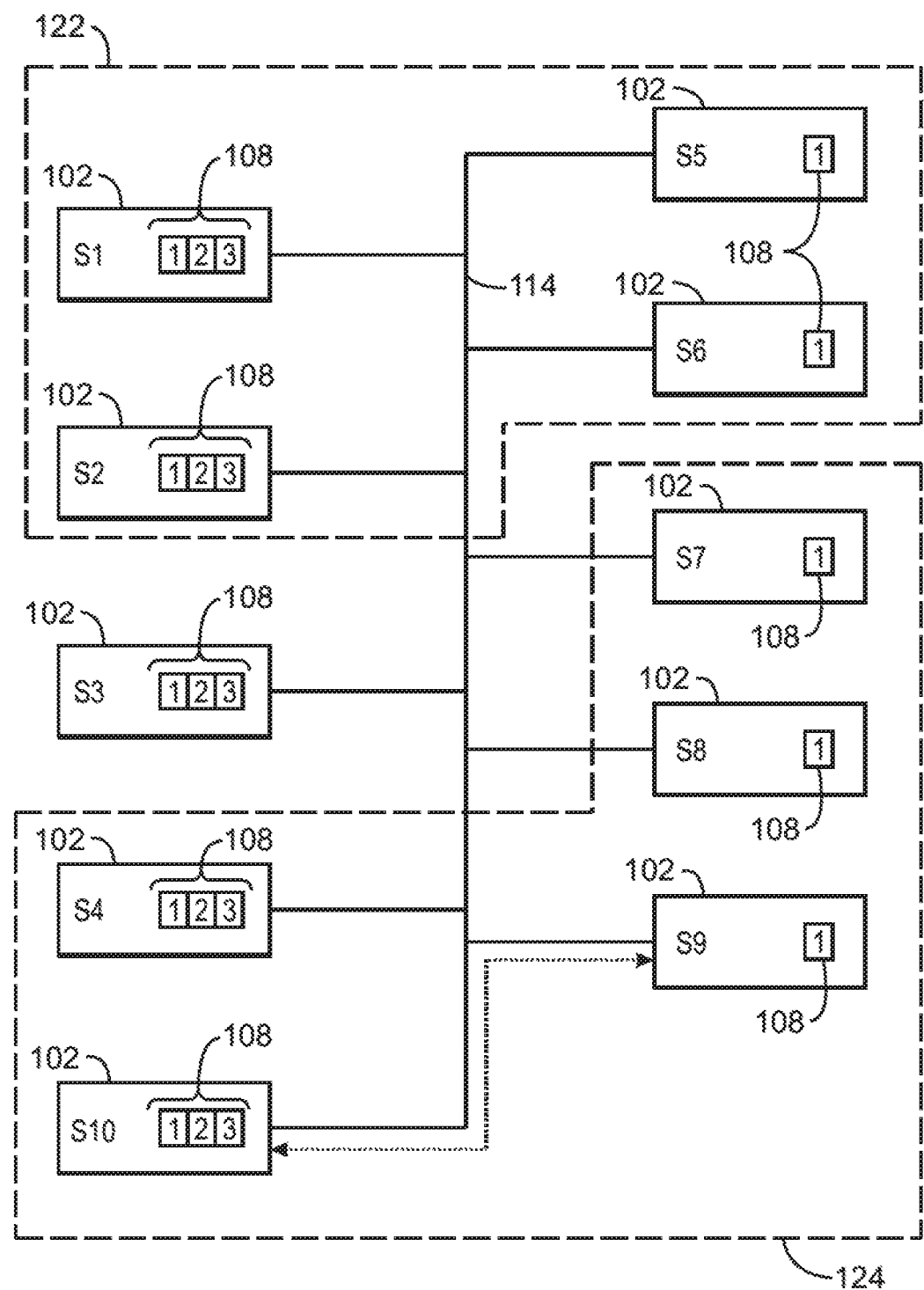
FIG. 1B is a schematic diagram of the example computing network illustrating the management groups created based on the matching codes.

FIG. 1B is a schematic diagram of the example computing network 100 illustrating the management groups 122 and 124 created based on the matching codes. Once the numeric codes 110 and 112 are used, new management groups 122 and 124 may be created, for example, including all members of the previous management groups, e.g., management group 104 becomes larger management group 122 and management groups 106 and 120 are combined to form management group 124. The remaining network unit 102 S3 may be added to a either of the other management groups 122 or 124 by entering another numeric code on the panel buttons 108 on S3 and the same numeric code any one member of the management groups 122 or 124. Entering the same numeric code for three network units 102, S3 and one member of both management groups 122 and 124, would combine all of the network units 102 into a single management group.

The second and subsequent numeric codes do not have to be entered immediately. In some examples, a numeric code may be entered into a first network unit 102 and then the same numeric code entered into a subsequent network unit 102 hours or even days later to join the management groups for each network unit 102. This can be controlled by a countdown timer that sets the time that the code remains valid. In environments in which security is an issue, the countdown timer may be set to a relatively low value, such as 120 seconds, 60 seconds, or less. In environments in which security is less of a problem, such as an initial configuration of a data center during a build phase, the countdown time may be set to much higher values, such as 1 hour, two hours, one day, or even longer.

Further, the number of network units 102 allowed to use a single numeric code may be selected. For example, the pairing of two network units 102 may result in the termination of that code. In other examples, the numeric code may remain valid for any number of subsequent network units 102. This may be useful during the initial configuration of a data center to allow large groups of network units 102 to be joined in the first creation of the management groups.

Figure 2:
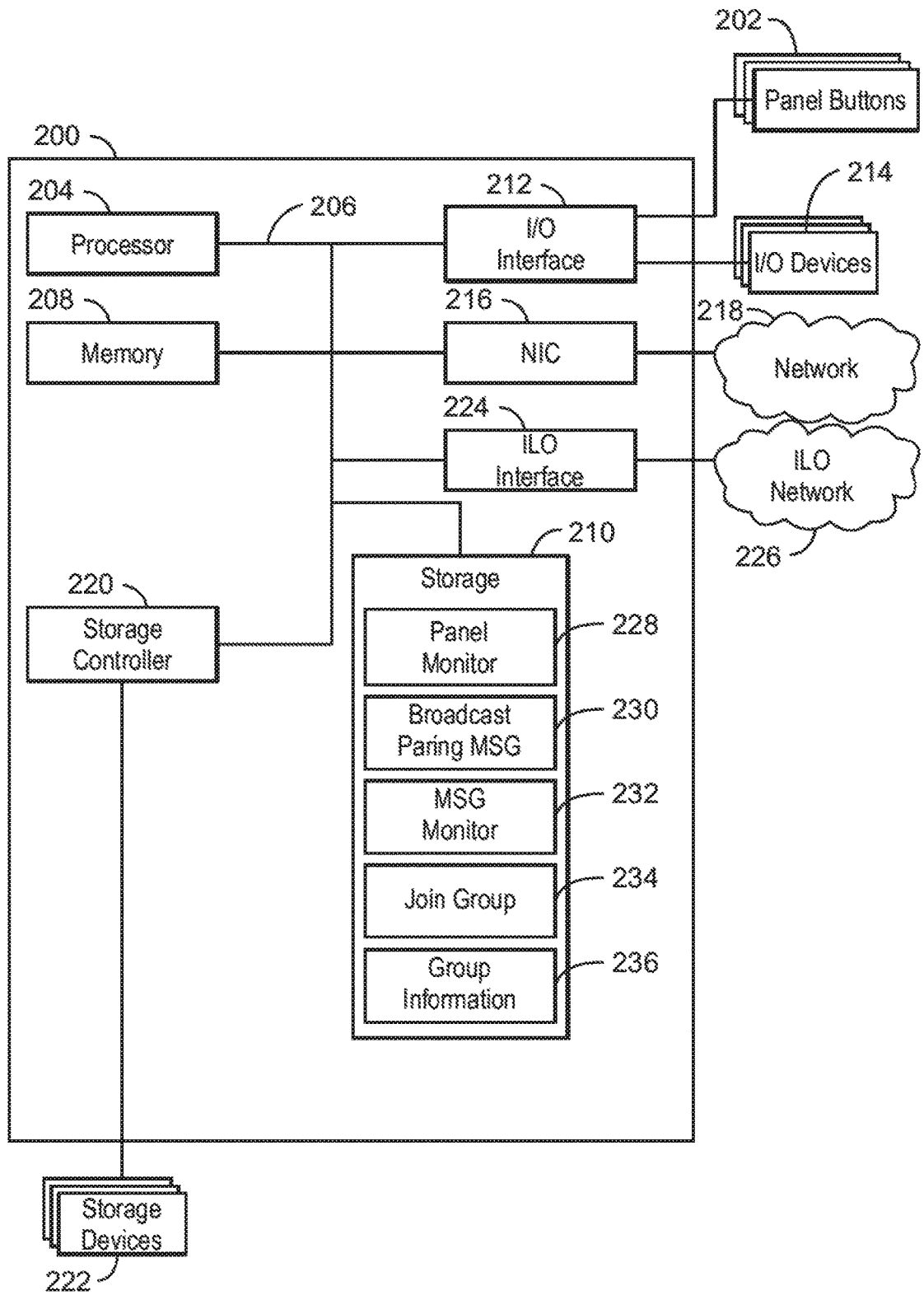
FIG. 2 is a block diagram of an example computing device that can be added to a management group using panel buttons.

FIG. 2 is a block diagram of an example of a computing device 200 that can be added to a management group using panel buttons 202. The computing device 200 may function as one of the network units 102 described with respect to FIG. 1. In some examples, the computing device 202 is a desktop computer, a business server, a blade server, a storage attached network (SAN), a network attached storage (NAS), and the like. The computing device 202 includes at least one processor 204. The processor can be a single core processor, a multicore processor, a processor cluster, and the like. The processor 204 is coupled to other units through a bus 206. The bus 206 can include PCIe interconnects, PCIx, or any number of other suitable technologies.

The computing device 200 can be linked through the bus 206 to a system memory 208. The system memory 208 can include random access memory (RAM), including volatile memory such as static random-access memory (SRAM) and dynamic random-access memory (DRAM), non-volatile memory such as resistive random-access memory (RRAM), and any other suitable memory types or combinations thereof. The computing device 200 can include a tangible, non-transitory, computer-readable storage media, such as a storage device 210 for the long-term storage of operating programs and data, including the operating programs and data such as user files.

The processor 204 may be coupled through the bus 206 to an I/O interface 212. The I/O interface 212 may be coupled to any suitable type of I/O devices 214, including input devices, such as a mouse, touch screen, keyboard, display, and the like. The I/O devices 214 may also be output devices such as a display monitors. The I/O interface 212 may couple the computing device 200 to the panel buttons 202. This may include both the input functions and the output or status lighting functions.

The computing device 200 can also include a network interface controller (NIC) 216, for connecting the computing device 200 to a network 218. In some examples, the network 218 may be an enterprise server network, a storage area network (SAN), a local area network (LAN), a wide-area network (WAN), or the Internet, for example. The network 218 may correspond to the network 114 described with respect to FIG. 1.

The processor 204 can also be coupled to a storage controller 220, which may be coupled to one or more storage devices 222, such as a storage disk, a solid state drive, an array of storage disks, a network attached storage appliance, among others. The presence of the storage devices 222 may allow the computing device 200 to function as a storage attached network (NAS) on the network.

The computing device 200 may also include a management controller 224, which may be communicatively coupled to management network 226. The management controller 224 enables a system administrator to remotely monitor and control the computing device 200 through a dedicated, out-of-band management network, the management network 226, which does not rely on other components of the computing device 200 to operate. The management controller 224 and management network 226 may provide an alternate channel for the pairing messages sent after a numeric code has been entered using the front panel buttons 202. Both the management controller 224 and the NIC 216 can act as a network interface for broadcasting the pairing messages over their respective networks.

The storage device 210 includes a number of modules that direct the processor 204 to implement the pairing functionality described herein. The modules may be part of the operating system for the unit or part of the baseboard management controller (BMC). A panel monitor 228 monitors the panel buttons for the presence of button presses and interprets the sequence of button presses to obtain the numeric code. A broadcast module 230 forms the messages that include the numeric code and an invitation to connect and then sends the message out over either the network 218, the management network 226, or both. A message monitor 232 monitors incoming traffic of the network 218, the management network 226, or both for a message that includes an invitation to connect and the same numeric code. If such a message is detected, a join group module 234 opens a link to the other computing device that broadcast the same code, and exchanges management group information 236, such as the identifications and password for all other computing devices that are in a current management group with the computing device 200. This allows the computing devices to form a new management group.

It is to be understood that the block diagram of FIG. 2 is not intended to indicate that the computing device 200 is to include all of the components shown in FIG. 2. Rather, the computing device 200 can include fewer or additional components not illustrated in FIG. 2. For example, the management controller 224 and management network 226 may not be present. Further, if the computing device 200 is a server or blade server, the storage controller 220 and external storage devices 222 may not be present. In one example, the computing device 200 may include additional processors, memory controller devices, network interfaces, etc.

Figure 3:
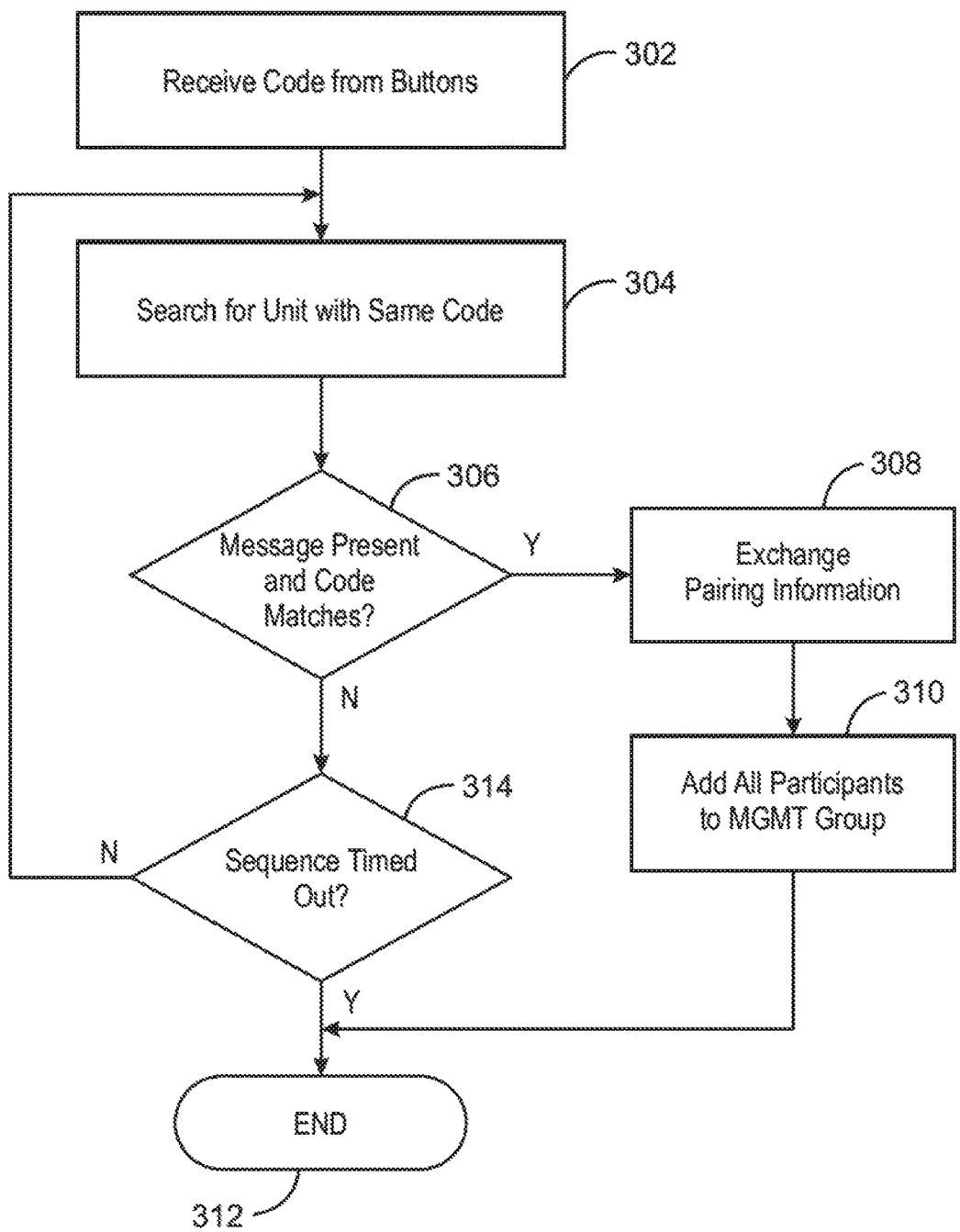
FIG. 3 is a process flow diagram of an example of a method for adding a network unit to a management group using panel buttons.

FIG. 3 is a process flow diagram of a method 300 for adding a network unit to a management group using panel buttons. The method 300 may be implemented by a device such as the network units 102 of FIG. 1 or the computing device 200 of FIG. 2. The method 300 starts at block 302 when a numeric code is received from panel buttons on a device. For example, the BMC firmware or the service OS looks for a particular pairing sequence/pin to be punched into the system using the panel buttons in the chassis. For example, the sequence may be a series of three presses of about a second each (1-1-1 or 3). This code is recorded and encoded into a 'PIN' value.

At block 304, the device searches for a unit with the same numeric code entered on the front. The BMC begins a special pairing pattern on the status LEDs, for example, a short-long pattern for a fixed time period. A countdown timer may be set to provide a 60 second window for the fixed time period. For those 60 seconds, entering a pattern on another system will awaken it into the same mode. Systems in this mode, termed a sync mode, attempt to locate other systems in the same state, for example, via UDP. If a UDP connect invitation is detected, at block 306 the code in the UDP message is compared to the numeric code. If the numeric code matches, a connection is made and an exchange of stored data for that numeric code group is performed at block 308.

For example, the information may include lightweight directory access protocol (LDAP) information to allow a login, a group membership like an management controller Federation, or a simple cross creation of service accounts. The light weight mechanism uses a listing of access keys or the creation of a list of user accounts for each node. For example, the mechanism may include collection of peers by the BMC or OS via UDP broadcasts. At block 310, all participants in the management groups may be added. For each peer in the list the target system is queried for a listing of known peers using the temporary or recorded password or numeric code. Each queried numeric code is compared with the current inventory along with the current timestamp. If the numeric code and timestamp are older than the current inventory it is discarded. If the numeric code is newer and is marked as active, the current list of peers is updated and that peer is added to the list to be queried. If the numeric code is newer and is marked as deleted, the current list of peers is updated to remove that server. Process flow then terminates at block 312.

If, at block 306, no message or code match is detected, process flow continues to block 314. At block 314 the countdown timer is checked to determine if the sequence has timed out. If not, process flow returns to block 304 to continue searching for another unit with the same code, e.g., by broadcasting UDP messages with the join invitation and the numeric code, and monitoring for messages with a join invitation and checking the numeric code. Once the countdown timer reaches zero, the process is timed out, and ends at block 312. However, depending on system settings the numeric code may remain active for some period of time. If a UDP message is received from another system with an invitation to join, the system may resume at block 304 to determine if the numeric codes are the same.

Figure 4:
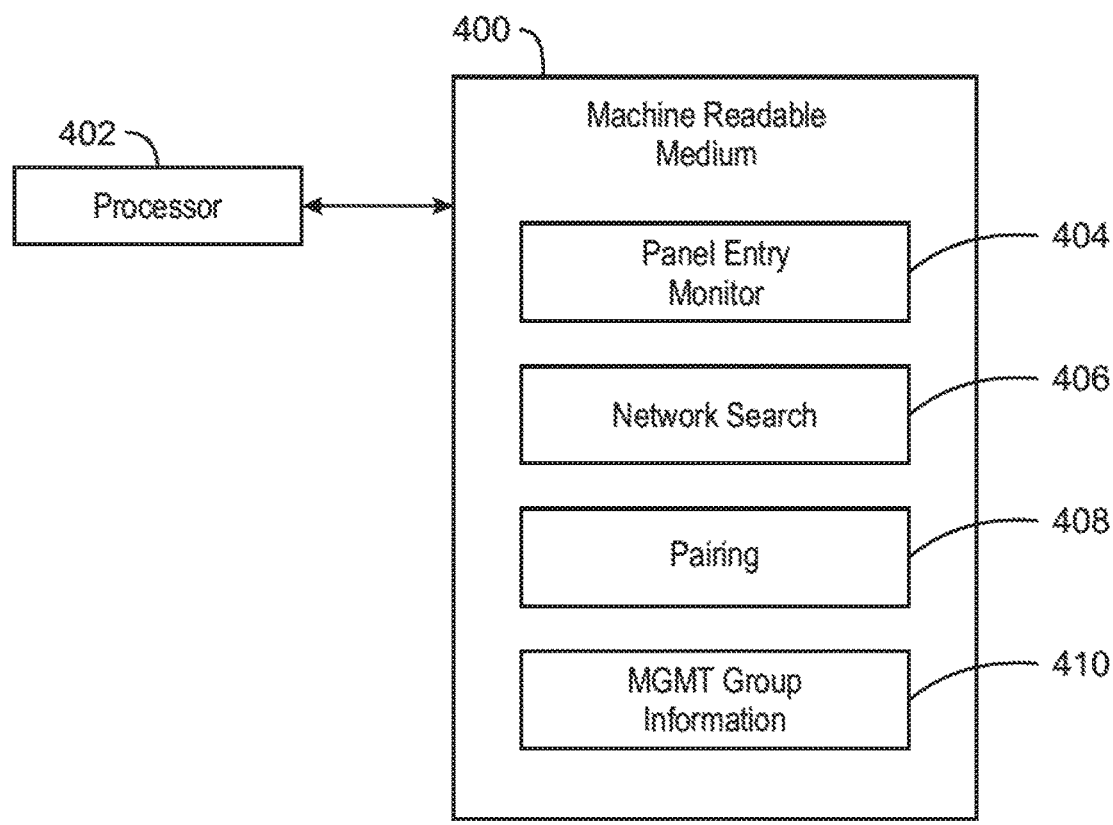
FIG. 4 is an example of non-transitory, machine readable medium including instructions to direct a processor to add a network unit to a management group using panel buttons.

FIG. 4 is a non-transitory, machine readable medium 400 including instructions to direct a processor 402 to add a network unit to a management group using panel buttons. The machine readable medium includes instructions 404 to direct the processor to monitor the panel buttons for the presence of button presses and interprets the button presses to obtain the numeric code. Instructions 406 direct the processor 402 to search for other units broadcasting the same code. For example, these instructions may direct the processor 402 to form messages that include the numeric code and an invitation to connect and then sends the message out over a network. These instructions 406 may also direct the processor to monitor incoming traffic from the network for a message that includes an invitation to connect and the same numeric code. If such a message is detected, instructions 408 direct the processor to open a link to the computing device that broadcast the same code, and exchange management group information 410, such as the identifications and password for all other computing devices that are in a current management group with the computing device of the processor. This allows the computing devices to form a new management group.

While the present techniques may be susceptible to various modifications and alternative forms, the techniques discussed above have been shown only by way of example. It is to be understood that the technique is not intended to be limited to the particular examples disclosed herein. Indeed, the present techniques include all alternatives, modifications, and equivalents falling within the scope of the following claims.

What is claimed is:

1. A method for automatically adding a network unit to a management group, comprising:
receiving, by a processor of a first network unit, a first numeric code on the first network unit entered through a panel button of the first network unit;
monitoring, by the processor of the first network unit, a network attached to the first network unit for one or more same state messages, the one or more same state messages comprising an invitation to join a management group and an associated numeric code;
detecting, by the processor of the first network unit, a same state message broadcast from a second network unit;
comparing, by the processor of the first network unit, the first numeric code and a second numeric code included in the same state message from the second network unit;
in response to identifying a match between the first numeric code and the second numeric code, establishing, by the processor of the first network unit, a communication connection with the second network unit based on the invitation to join a management group of the same state message from the second network unit;
sending, by the processor of the first network unit, management group information to the second network unit, the management group information comprising one or more identifications and passwords for one or more network devices in a management group having the first network unit as a peer; and
updating, by the processor of the first network unit, a peer list to include the second network unit as a peer of the management group having the first network unit as a peer.

2. The method of claim 1, wherein the one or more same state messages comprise a uniform datagram protocol (UDP) message.

3. The method of claim 1, wherein a timestamp associated with the second numeric code identifies when the second numeric code was entered through a panel button of the second network unit, the method further comprising:
  determining, by the processor of the first network unit, whether the second numeric code is an active numeric code, wherein an active numeric code is a numeric code whose timestamp is after a timestamp associated with the first numeric code entered through the panel button of the first network unit; and
  in response to determining the second numeric code is active, updating, by the processor of the first network unit, the peer list to include the second network unit as a peer of the management group having the first network unit as a peer.

4. The method of claim 1, comprising:
  starting, by the processor of the first network unit, a countdown timer upon receipt of the first numeric code entered through from the button button of the first network unit; and
  stopping, by the processor of the first network unit, the monitoring of the network attached to the first network unit when the countdown timer reaches a value of zero.

5. The method of claim 4, comprising:
  detecting, by the processor of the first network unit, a second same state message comprising a third numeric code from a third network unit after the countdown timer has reached zero;
  determining, by the processor of the first network unit, if the third numeric code matches the first numeric code;
  in response to determining the third numeric code and the first numeric code matches, sending, by the processor of the first network unit, management group information to the third network unit, the management group information comprising one or more identifications and passwords for one or more network devices in a management group having the first network unit as a peer; and
  updating, by the processor of the first network unit, a peer list to include the third network unit as a peer of the management group having the first network unit as a peer.

6. The method of claim 1, further comprising:
  receiving, by the processor of the first network unit, second management group information from the second network unit, the second management group information comprising one or more identifications and passwords of one or more network units in a management group having the second network unit as a peer;
  identifying, by the processor of the first network unit, each of the one or more network devices in the management group having the second network unit as a peer; and
  updating, by the processor of the first network unit, a peer list to include the identified one or more network units as one or more peers of the management group having the first network unit as a peer.

7. A network unit, comprising:
  a processor;
  a network interface;
  a panel button; and
  a storage device, comprising machine readable instructions to direct the processor to:
    accept, by the processor, a first numeric code entered through the panel button;
    monitor, by the processor, a network attached to the network unit for one or more same state messages, the one or more same state messages comprising an invitation to join a management group and an associated numeric code;
    detect, by the processor, a same state message broadcast from a second network unit;
    compare, by the processor, the first numeric code and a second numeric code included in the same state message from the second network unit;
    in response to identifying a match between the first numeric code and the second numeric code, establish, by the processor, a communication connection with the second network unit based on the invitation to join a management group of the same state message from the second network unit;
    send, by the processor, management group information to the second network unit, the management group information comprising one or more identifications and passwords for one or more network devices in a management group having the network unit as a peer; and
    update, by the processor, a peer list to include the second network unit as a peer of the management group having the network unit as a peer.

8. The network unit of claim 7, wherein the panel button comprises one or more buttons configured to accept the first numeric code.

9. The network unit of claim 7, wherein the panel button comprises a single button, and wherein the instructions further direct the processor to translate a sequence of button presses into the first numeric code.

10. The network unit of claim 7, wherein the instructions further direct the processor to broadcast a same state message over a management network through the network interface, the same state message comprising the first numeric.

11. The network unit of claim 7, wherein the network unit comprises a server.

12. A non-transitory computer readable medium for adding a network unit to a management group, comprising code to direct a processor to:
  accept, by the processor, a first numeric code on a first network unit entered through a panel button of the first network unit;
  monitor, by the processor, a network attached to the first network unit for one or more same state messages;
  detect, by the processor, a same state message broadcast from a second network unit;
  compare, by the processor, the first numeric code and a second numeric code included in the same state message from the second network unit;
  in response to identifying a match between the first numeric code and the second numeric code, establish, by the processor, a communication connection with the second network unit based on the invitation to join a management group of the same state message from the second network unit;
  send, by the processor, management group information to the second network unit, the management group information comprising one or more identifications and passwords for one or more network devices in a management group having the first network unit as a peer; and
  update, by the processor, a peer list to include the second network unit as a peer of the management group having the first network unit as a peer.

13. The non-transitory computer readable medium of claim 12, comprising code to direct the processor to stop monitoring the network for the message after a period of time.

* * * * *